US007631172B2

(12) United States Patent
Henry et al.

(10) Patent No.: US 7,631,172 B2
(45) Date of Patent: *Dec. 8, 2009

(54) APPARATUS AND METHOD FOR SELECTIVELY OVERRIDING RETURN STACK PREDICTION IN RESPONSE TO DETECTION OF NON-STANDARD RETURN SEQUENCE

(75) Inventors: G. Glenn Henry, Austin, TX (US); Thomas C. McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/609,261

(22) Filed: Dec. 11, 2006

(65) Prior Publication Data

US 2007/0083741 A1 Apr. 12, 2007

Related U.S. Application Data

(63) Continuation of application No. 10/679,830, filed on Oct. 6, 2003, now Pat. No. 7,237,098.

(60) Provisional application No. 60/501,203, filed on Sep. 8, 2003.

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/239
(58) Field of Classification Search .................. 712/239
See application file for complete search history.

(56) References Cited

U.S. PATENT DOCUMENTS 3,980,991 A 9/1976 Mercurio

| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |

(Continued)

FOREIGN PATENT DOCUMENTS

| WO | WO99/32965 | 7/1999 |
| WO | WO02/08895 | 1/2002 |

OTHER PUBLICATIONS

McFarling; Combining Branch Predictors; 1993; Western Research Laboratory Technical Note TN-36.*
Jimenez et al.; The Impact of Delay on the Design of Branch Predictors; 2000; International Symposium on Microarchitecture.*
*Microprocessor Report*. vol. 9. No. 2. Feb. 16, 1995. p. 5.

(Continued)

*Primary Examiner*—Eddie P Chan
*Assistant Examiner*—Corey S Faherty
(74) *Attorney, Agent, or Firm*—E. Alan Davis; James W. Huffman

(57) ABSTRACT

A microprocessor for predicting return instruction target addresses is disclosed. A branch target address cache stores a plurality of target address predictions and a corresponding plurality of override indicators for a corresponding plurality of return instructions, and provides a prediction of the target address of the return instruction from the target address predictions and provides a corresponding override indicator from the override indicators. Each has a true value when the return stack has mispredicted the target address of the corresponding return instruction for a most recent execution of the return instruction. A return stack also provides a prediction of the target address of the return instruction. Branch control logic causes the microprocessor to branch to the prediction of the target address provided by the BTAC, and not to the prediction of the target address provided by the return stack, when the override indicator is a true value.

29 Claims, 4 Drawing Sheets

U.S. PATENT DOCUMENTS

| | | | |
|---|---|---|---|
| 5,148,538 A | 9/1992 | Celtruda et al. | |
| 5,163,140 A | 11/1992 | Stiles et al. | |
| 5,313,634 A | 5/1994 | Eickemeyer | |
| 5,353,421 A | 10/1994 | Emma et al. | |
| 5,355,459 A | 10/1994 | Matsuo et al. | |
| 5,394,530 A | 2/1995 | Kitta | |
| 5,404,467 A | 4/1995 | Saba et al. | |
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A * | 2/1997 | Hoyt et al. | 712/243 |
| 5,623,614 A | 4/1997 | Van Dyke et al. | |
| 5,623,615 A | 4/1997 | Salem et al. | |
| 5,634,103 A | 5/1997 | Dietz et al. | |
| 5,687,349 A | 11/1997 | McGarity | |
| 5,687,360 A | 11/1997 | Chang | |
| 5,706,491 A | 1/1998 | McMahan | |
| 5,721,855 A | 2/1998 | Hinton et al. | |
| 5,732,243 A | 3/1998 | McMahan | |
| 5,734,881 A | 3/1998 | White et al. | |
| 5,752,069 A | 5/1998 | Roberts et al. | |
| 5,761,723 A | 6/1998 | Black et al. | |
| 5,768,576 A | 6/1998 | Hoyt et al. | |
| 5,802,602 A | 9/1998 | Rahman et al. | |
| 5,805,877 A | 9/1998 | Black et al. | |
| 5,812,839 A | 9/1998 | Hoyt et al. | |
| 5,828,901 A | 10/1998 | O'Toole et al. | |
| 5,832,289 A | 11/1998 | Shaw et al. | |
| 5,850,532 A | 12/1998 | Narayan et al. | |
| 5,850,543 A * | 12/1998 | Shiell et al. | 712/238 |
| 5,864,707 A | 1/1999 | Tran et al. | |
| 5,867,701 A | 2/1999 | Brown et al. | |
| 5,881,260 A | 3/1999 | Raje et al. | |
| 5,881,265 A | 3/1999 | McFarland et al. | |
| 5,931,944 A | 8/1999 | Ginosar et al. | |
| 5,948,100 A | 9/1999 | Hsu et al. | |
| 5,961,629 A | 10/1999 | Nguyen et al. | |
| 5,964,868 A | 10/1999 | Gochman et al. | |
| 5,968,169 A | 10/1999 | Pickett | |
| 5,974,543 A | 10/1999 | Hilgendorf et al. | |
| 5,978,909 A | 11/1999 | Lempel | |
| 6,035,391 A | 3/2000 | Isaman | |
| 6,041,405 A | 3/2000 | Green | |
| 6,044,459 A | 3/2000 | Bae et al. | |
| 6,081,884 A | 6/2000 | Miller | |
| 6,085,311 A | 7/2000 | Narayan et al. | |
| 6,088,793 A | 7/2000 | Liu et al. | |
| 6,101,595 A | 8/2000 | Pickett et al. | |
| 6,108,773 A | 8/2000 | Col et al. | |
| 6,122,729 A | 9/2000 | Tran | |
| 6,134,654 A * | 10/2000 | Patel et al. | 712/233 |
| 6,151,671 A | 11/2000 | D'Sa et al. | |
| 6,154,833 A | 11/2000 | Murty et al. | |
| 6,157,988 A | 12/2000 | Dowling | |
| 6,170,054 B1 | 1/2001 | Poplingher | |
| 6,175,897 B1 | 1/2001 | Ryan et al. | |
| 6,185,676 B1 | 2/2001 | Poplingher et al. | |
| 6,233,676 B1 | 5/2001 | Henry et al. | |
| 6,250,821 B1 | 6/2001 | Schwendinger | |
| 6,256,727 B1 | 7/2001 | McDonald | |
| 6,260,138 B1 | 7/2001 | Harris | |
| 6,279,105 B1 | 8/2001 | Konigsburg et al. | |
| 6,279,106 B1 | 8/2001 | Roberts | |
| 6,308,259 B1 | 10/2001 | Witt | |
| 6,314,514 B1 | 11/2001 | McDonald | |
| 6,321,321 B1 | 11/2001 | Johnson | |
| 6,351,796 B1 | 2/2002 | McCormick et al. | |
| 6,374,349 B1 * | 4/2002 | McFarling | 712/239 |
| 6,374,350 B1 | 4/2002 | D'Sa et al. | |
| 6,381,692 B1 | 4/2002 | Martin et al. | |
| 6,418,525 B1 | 7/2002 | Charney et al. | |
| 6,457,120 B1 | 9/2002 | Sinharoy | |
| 6,502,185 B1 | 12/2002 | Keller et al. | |
| 6,560,696 B1 | 5/2003 | Hummel et al. | |
| 6,601,161 B2 | 7/2003 | Rappoport et al. | |
| 6,647,467 B1 | 11/2003 | Dowling | |
| 6,725,357 B1 | 4/2004 | Cousin | |
| 6,748,441 B1 | 6/2004 | Gemmell | |
| 6,754,808 B1 | 6/2004 | Roth et al. | |
| 6,757,815 B2 | 6/2004 | Kacevas | |
| 6,823,444 B1 * | 11/2004 | Henry et al. | 712/207 |
| 6,886,093 B2 * | 4/2005 | Henry et al. | 712/239 |
| 6,895,498 B2 | 5/2005 | McDonald et al. | |
| 6,898,699 B2 | 5/2005 | Jourdan et al. | |
| 6,910,124 B1 * | 6/2005 | Sinharoy | 712/228 |
| 6,968,444 B1 | 11/2005 | Kroesche et al. | |
| 7,024,545 B1 * | 4/2006 | Zuraski et al. | 712/240 |
| 2002/0099928 A1 | 7/2002 | Janik et al. | |
| 2002/0188833 A1 | 12/2002 | Henry et al. | |
| 2002/0194460 A1 | 12/2002 | Henry et al. | |
| 2002/0194461 A1 | 12/2002 | Henry et al. | |
| 2002/0194463 A1 * | 12/2002 | Henry et al. | 712/239 |
| 2002/0194464 A1 | 12/2002 | Henry et al. | |
| 2003/0236969 A1 | 12/2003 | Kacevas et al. | |
| 2004/0030866 A1 | 2/2004 | McDonald | |
| 2004/0139281 A1 | 7/2004 | McDonald | |
| 2004/0139292 A1 | 7/2004 | McDonald | |
| 2004/0139301 A1 | 7/2004 | McDonald | |
| 2004/0143709 A1 | 7/2004 | McDonald | |
| 2004/0143727 A1 | 7/2004 | McDonald | |
| 2005/0044343 A1 | 2/2005 | Henry et al. | |
| 2005/0076193 A1 * | 4/2005 | Henry et al. | 712/238 |
| 2005/0114636 A1 | 5/2005 | McDonald et al. | |
| 2005/0132175 A1 | 6/2005 | Henry et al. | |
| 2005/0198479 A1 | 9/2005 | Bean et al. | |
| 2005/0198481 A1 | 9/2005 | Henry et al. | |
| 2005/0268076 A1 | 12/2005 | Henry et al. | |
| 2006/0010310 A1 | 1/2006 | Bean et al. | |
| 2006/0218385 A1 | 9/2006 | Smith et al. | |

OTHER PUBLICATIONS

*Microprocessor Report.* Aug. 23, 1999. p. 7.

Yeh et al. *Alternative Implementation of Two-Level Adaptive Branch Prediction.* 19th Annual International Symposium on Computer Architecture. pp. 124-134. May 19-21, 1992. Gold Coast, Australia.

Chang et al. *Alternative Implementations of Hybrid Branch Predictors.* Proceedings of MICRO-28. 1995. IEEE.

Mc Farling, Scott. *WRL Technical Note TN-36.* Combining Branch Predictors. Jun. 1993. Western Research Laboratory, 250 University Ave., Palo Alto, CA 94301.

Bray et al. *Strategies for Branch Target Buffers.* Technical Report No. CSL-TR-91-480. Jun. 1991.

Sakamoto et al. *Microarchitecture Support for Reducing Branch Penalty in a Superscaler Processor.* pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

Online Computing Dictionary. http://instantweb.com/d/dictionary/foldoc.cgi?query=btb May 5, 1995. Branch Target Buffer.

The D Latch, Play-Hookey Web Page, Oct 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1996.

Patterson et al. "Computer Organization & Design: The Hardware/Software Interface." Morgan Kaufmann Publishers, Inc. San Francisco, CA. 1998 pp. 453-455.

IBM Technical Disclosure Bulletin NN9204269, "Return Address Stack Cache." Apr. 1992, pp. 269-271.

Qureshi et al. "The V-Way Cache: Demand Based Associativity via Global Replacement." High Performance Systems Group, Department of Electrical and Computer Engineering, The University of Texas at Austin. Austin, TX TR-HPS-2004-003. Oct. 2004.

Skadron et al. "Branch Prediction, Instruction-Window Size, and Cache Size: Performance Trade-Offs and Simulation Techniques." IEEE Transactions on Computers. vol. 48. No. 11. Nov. 1999. pp. 1260-1281.

Inoue, Koji et al. "Performance/Energy Efficiency of Variable Line-Size Caches for Intelligent Memory Systems." IMS 2000, LNCS 2107, pp. 169-178, 2001.

* cited by examiner

Return Stack Override Operation

*Fig. 6* — Return Stack Override Operation (Alternate Embodiment)
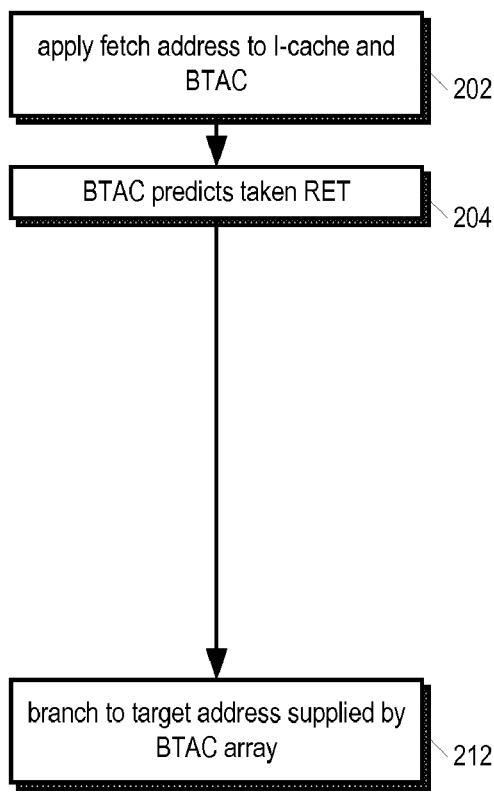

US 7,631,172 B2

APPARATUS AND METHOD FOR SELECTIVELY OVERRIDING RETURN STACK PREDICTION IN RESPONSE TO DETECTION OF NON-STANDARD RETURN SEQUENCE

CROSS REFERENCE TO RELATED APPLICATIONS

This application is a continuation of application Ser. No. 10/679,830, filed Oct. 6, 2003, which claims priority based on U.S. Provisional Application No. 60/501,203, filed Sep. 8, 2003.

BACKGROUND OF THE INVENTION

Field of the Invention

This invention relates in general to the field of branch prediction in microprocessors and particularly to return instruction target address prediction using return stacks and branch target address caches.

A microprocessor is a digital device that executes instructions specified by a computer program. Modern microprocessors are typically pipelined. That is, they operate on several instructions at the same time, within different blocks or pipeline stages of the microprocessor. Hennessy and Patterson define pipelining as, "an implementation technique whereby multiple instructions are overlapped in execution." Computer Architecture: A Quantitative Approach, $2^{nd}$ edition, by John L. Hennessy and David A. Patterson, Morgan Kaufmann Publishers, San Francisco, Calif., 1996. They go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

A potential cause of pipeline bubbles is branch instructions. When a branch instruction is encountered, the processor must determine the target address of the branch instruction and begin fetching instructions at the target address rather than the next sequential address after the branch instruction. Because the pipeline stages that definitively determine the target address are well below the stages that fetch the instructions, bubbles are created by branch instructions. As discussed more below, microprocessors typically include branch prediction mechanisms to reduce the number of bubbles created by branch instructions.

One particular type of branch instruction is a return instruction. A return instruction is typically the last instruction executed by a subroutine for the purpose of restoring program flow to the calling routine, which is the routine that caused program control to be given to the subroutine. In a typical program sequence, the calling routine executes a call instruction. The call instruction instructs the microprocessor to push a return address onto a stack in memory and then to branch to the address of the subroutine. The return address pushed onto the stack is the address of the instruction that follows the call instruction in the calling routine. The subroutine ultimately executes a return instruction, which pops the return address off the stack, which was previously pushed by the call instruction, and branches to the return address, which is the target address of the return instruction. An example of a return instruction is the x86 RET instruction. An example of a call instruction is the x86 CALL instruction.

An advantage of performing call/return sequences is that it allows subroutine call nesting. For example, a main routine may call subroutine A that pushes a return address; and subroutine A may call subroutine B that pushes a return address; then subroutine B executes a return instruction that pops the return address pushed by subroutine A; then subroutine A executes a return instruction that pops the return address pushed by the main routine. The notion of nesting subroutine calls is very useful and the example above may be extended to as many calls deep as the stack size can support.

Because of the regular nature of call/return instruction sequences, modern microprocessors employ a branch prediction mechanism commonly referred to as a return stack to predict the target addresses of return instructions. The return stack is a small buffer that caches return addresses in a last-in-first-out manner. Each time a call instruction is encountered, the return address to be pushed onto the memory stack is also pushed onto the return stack. Each time a return instruction is encountered, the return address at the top of the return stack is popped and used as the predicted target address of the return instruction. This operation reduces bubbles, since the microprocessor does not have to wait for the return address to be fetched from the memory stack.

Return stacks typically predict return instruction target addresses very accurately due to the regular nature of call/return sequences. However, the present inventors have discovered that certain programs, such as certain operating systems, do not always execute call/ret instructions in the standard fashion. For example, code executing on an x86 microprocessor may include a CALL, then a PUSH to place a different return address on the stack, then a RET, which causes a return to the pushed return address rather than to the address of the instruction after the CALL, which was pushed onto the stack by the CALL. In another example, the code performs a PUSH to place a return address on the stack, then performs a CALL, then performs two RET instructions, which causes a return to the pushed return address in the case of the second RET rather than to the instruction after a CALL that preceded the PUSH. This behavior causes a misprediction by a return stack.

Therefore, what is needed is an apparatus for more accurately predicting a return instruction target address, particularly for code that executes a non-standard call/return sequence.

SUMMARY

The present invention provides an apparatus for detecting a return stack misprediction and responsively setting an override flag associated with the return instruction so that upon the next occurrence of the return instruction the microprocessor can predict the return instruction target address by a mechanism other than the return stack. A branch target address cache (BTAC) is employed to store the override flag associated with the return instruction. In one embodiment, the other mechanism for predicting the return instruction target address is the BTAC, which is perhaps typically less accurate at predicting a return instruction target address than the return stack in the case of a normal call/return sequence, but more accurate in the case of code that executes a non-standard call/return sequence.

In one aspect the present invention provides a microprocessor. The microprocessor includes a branch target address cache (BTAC), configured to store a plurality of target address predictions and a corresponding plurality of override indicators for a corresponding plurality of return instructions. The BTAC is also configured to provide a prediction of the target address of the return instruction from among the plurality of target address predictions and to provide a corresponding override indicator from among the plurality of override indicators. Each of the plurality of override indicators has a true value when the return stack has mispredicted the target address of the corresponding return instruction for a most recent execution of the return instruction. The microprocessor also includes a return stack, configured to provide a prediction of the target address of the return instruction. The microprocessor also includes branch control logic, coupled to the return stack and the BTAC, configured to cause the microprocessor to branch to the prediction of the target address provided by the BTAC, and not to the prediction of the target address provided by the return stack, when the override indicator is a true value.

In another aspect, the present invention provides a method for predicting a target address of a return instruction in a microprocessor. The method includes storing in a branch target address cache (BTAC) a plurality of target address predictions and a corresponding plurality of override indicators for a corresponding plurality of return instructions. Each of the plurality of override indicators has a true value when the return stack has mispredicted the target address of the corresponding return instruction for a most recent execution of the return instruction. The method also includes providing from the BTAC a prediction of the target address of the return instruction from among the plurality of target address predictions and providing a corresponding override indicator from among the plurality of override indicators. The method also includes providing from a return stack a prediction of the target address of the return instruction. The method also includes determining whether the override indicator provided by the BTAC has a true value. The method also includes causing the microprocessor to branch to the prediction of the target address provided by the BTAC, and not to the prediction of the target address provided by the return stack, if the override indicator is a true value.

In another aspect, the present invention provides a computer program product for use with a computing device, the computer program product including a computer usable storage medium, having computer readable program code embodied in the medium, for causing a microprocessor. The computer readable program code includes first program code for providing a branch target address cache (BTAC), configured to store a plurality of target address predictions and a corresponding plurality of override indicators for a corresponding plurality of return instructions, and configured to provide a prediction of the target address of the return instruction from among the plurality of target address predictions and to provide a corresponding override indicator from among the plurality of override indicators. Each of the plurality of override indicators has a true value when the return stack has mispredicted the target address of the corresponding return instruction for a most recent execution of the return instruction. The computer readable program code also includes second program code for providing a return stack, configured to provide a prediction of the target address of the return instruction. The computer readable program code also includes third program code for providing branch control logic, coupled to the return stack and the BTAC, configured to cause the microprocessor to branch to the prediction of the target address provided by the BTAC, and not to the prediction of the target address provided by the return stack, when the override indicator is a true value.

An advantage of the present invention is that it potentially improves branch prediction accuracy of programs that engage in non-standard call/return sequences. Simulations performed have shown a performance improvement on benchmark scores when employing the override mechanism as described in embodiments herein. Additionally, the advantage is realized with the addition of a small amount of hardware if a microprocessor already includes a BTAC and an alternate return instruction target address prediction mechanism.

Other features and advantages of the present invention will become apparent upon study of the remaining portions of the specification and drawings.

BRIEF DESCRIPTION OF THE DRAWINGS

FIG. 6 is a flowchart illustrating operation of the microprocessor of FIG. 5 according to an alternate embodiment of the present invention.

DETAILED DESCRIPTION

Figure 1:
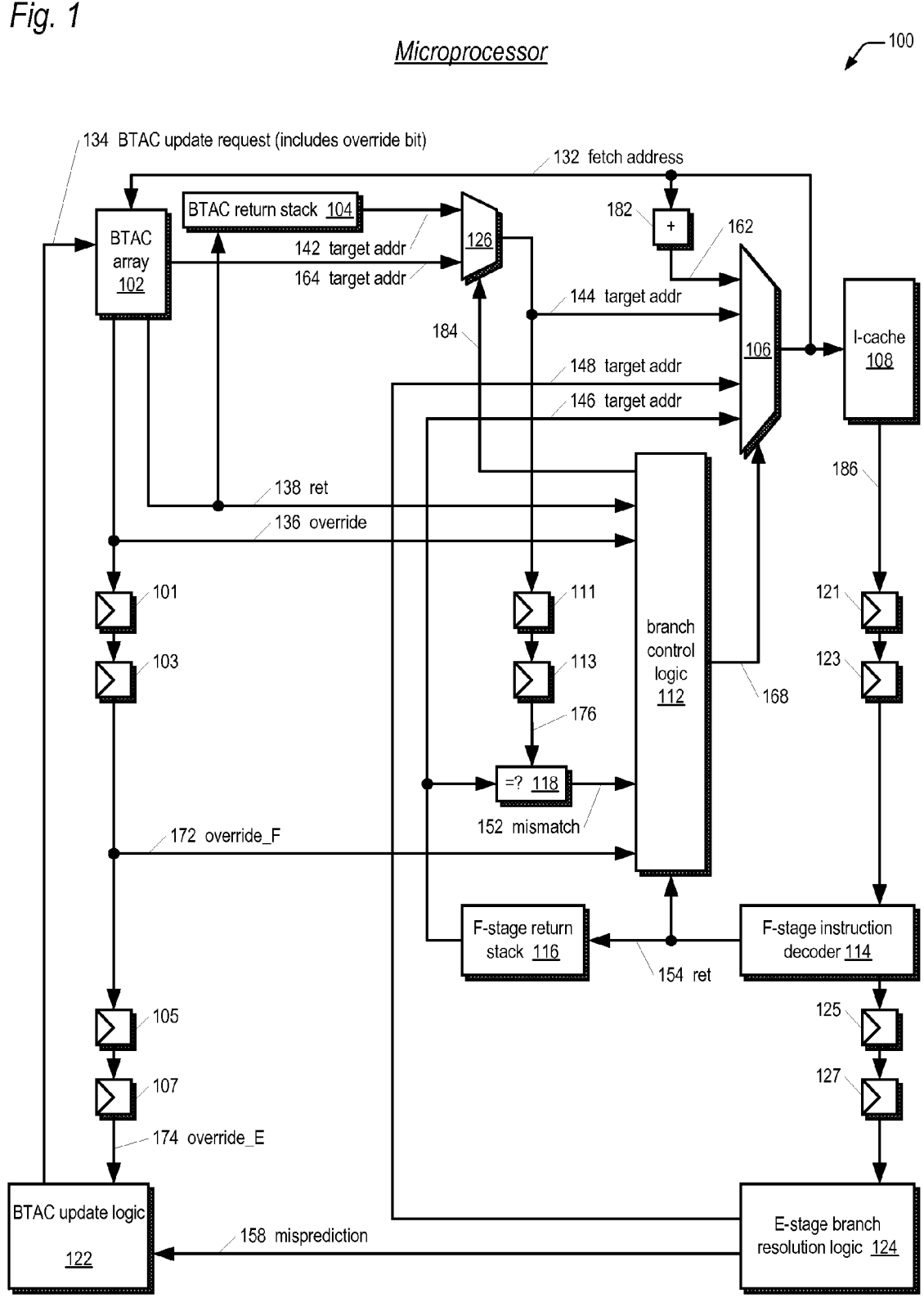
FIG. 1 is a block diagram of a pipelined microprocessor according to the present invention.

Referring now to FIG. 1, a block diagram of a pipelined microprocessor 100 according to the present invention is shown. In one embodiment, microprocessor 100 comprises a microprocessor whose instruction set conforms substantially to an x86 architecture instruction set, including x86 CALL and RET instructions. However, the present invention is not limited to x86 architecture microprocessors, but rather may be employed in any microprocessor that employs a return stack to predict target addresses of return instructions.

Microprocessor 100 includes an instruction cache 108. The instruction cache 108 caches instruction bytes from a system memory coupled to microprocessor 100. Instruction cache 108 caches lines of instruction bytes. In one embodiment, a cache line comprises 32 bytes of instruction bytes. Instruction cache 108 receives a fetch address 132 from a multiplexer 106. Instruction cache 108 outputs a cache line of instruction bytes 186 specified by fetch address 132 if fetch address 132 hits in instruction cache 108. In particular, the cache line of instruction bytes 186 specified by fetch address 132 may include one or more return instructions. The instruction bytes 186 are piped down the microprocessor 100 pipeline via pipeline registers 121 and 123, as shown. Although only two pipeline registers 121 and 123 are shown for piping down instruction bytes 186, other embodiments may include more pipeline stages.

Microprocessor 100 also includes an instruction decoder, referred to as F-stage instruction decoder 114, coupled to the output of pipeline register 123. Instruction decoder 114 receives instruction bytes 186 and related information and decodes the instruction bytes. In one embodiment, microprocessor 100 supports instructions of variable length. Instruction decoder 114 receives a stream of instruction bytes and formats the instructions into discrete instructions, determining the length of each instruction. In particular, instruction decoder 114 generates a true value on a ret signal 154 to indicate that it has decoded a return instruction. In one embodiment, microprocessor 100 includes a reduced-instruction-set-computer (RISC) core that executes microinstructions, and instruction decoder 114 translates macroinstructions, such as x86 macroinstructions, into microinstructions of the native RISC instruction set. The microinstructions are piped down the microprocessor 100 pipeline via pipeline registers 125 and 127, as shown. Although only two pipeline registers 125 and 127 are shown for piping down the microinstructions, other embodiments may include more pipeline stages. For example, the stages may include a register file, an address generator, a data load/store unit, an integer execution unit, a floating-point execution unit, an MMX execution unit, an SSE execution unit, and an SSE-2 execution unit.

Microprocessor 100 also includes branch resolution logic, referred to as E-stage branch resolution logic 124, coupled to the output of pipeline register 127. Branch resolution logic 124 receives branch instructions, including return instructions, as they migrate down the microprocessor 100 pipeline and makes a final determination of the target address of all branch instructions. Branch resolution logic 124 provides the correct branch instruction target address as an input to multiplexer 106 on E-stage target address signal 148. Additionally, if a target address was predicted for the branch instruction, branch resolution logic 124 receives a predicted target address. Branch resolution logic 124 compares the predicted target address with the correct target address 148 and determines whether a misprediction of the target address was made, such as by a BTAC array 102, a BTAC return stack 104, or an F-stage return stack 116, which are all described in detail below. If a target address misprediction was made, branch resolution logic 124 generates a true value on a misprediction signal 158.

Microprocessor 100 also includes branch control logic 112, coupled to multiplexer 106. Branch control logic 112 generates a mux select signal 168 to control multiplexer 106 to select one of multiple input addresses, described below, to output as fetch address 132. The operation of branch control logic 112 is described in more detail below.

Microprocessor 100 also includes an adder 182 that receives fetch address 132 and increments fetch address 132 to provide a next sequential fetch address 162 as an input to multiplexer 106. If no branch instructions are predicted or executed during a given clock cycle, branch control logic 112 controls multiplexer 106 to select next sequential fetch address 162.

Microprocessor 100 also includes a branch target address cache (BTAC) array 102, coupled to receive fetch address 132. BTAC array 102 includes a plurality of storage elements, or entries, each for caching a branch instruction target address and related branch prediction information. When fetch address 132 is input to instruction cache 108 and instruction cache 108 responsively provides the line of instruction bytes 186, BTAC array 102 substantially concurrently provides a prediction of whether a branch instruction is present in the cache line 186, a predicted target address of the branch instruction, and whether the branch instruction is a return instruction. Advantageously, according to the present invention, BTAC array 102 also provides an override indicator for indicating whether the target address of the return instruction should be predicted by the BTAC array 102 rather than by a return stack, as described below in detail.

The target address 164 of the return instruction predicted by BTAC array 102 is provided as an input to a second multiplexer 126. The output of multiplexer 126, target address 144, is provided as an input to multiplexer 106. Target address 144 is also piped down the microprocessor 100 pipeline via pipeline registers 111 and 113, as shown. The output of pipeline register 113 is referred to as target address 176. Although only two pipeline registers 111 and 113 are shown for piping down target address 144, other embodiments may include more pipeline stages.

In one embodiment, BTAC array 102 is configured as a 2-way set associative cache capable of storing 4096 target addresses and related information. However, the present invention is not limited to a particular embodiment of BTAC array 102. In one embodiment, the lower bits of fetch address 132 select one set, or row, in BTAC array 102. An address tag is stored for each entry in BTAC array 102 that indicates the upper address bits of the address of the branch instruction whose target address is stored in the corresponding entry. The upper bits of fetch address 132 are compared with the address tags of each entry of the selected set. If the upper bits of fetch address 132 match a valid address tag in the selected set, then a hit in BTAC array 102 occurs, which indicates that BTAC array 102 predicts a branch instruction is present in the instruction cache line 186 selected by fetch address 132 and output by instruction cache 108 substantially concurrently with target address prediction 164.

Each entry of BTAC array 102 also stores an indication of the type of branch instruction present in the instruction cache line 186 specified by fetch address 132. That is, BTAC array 102 also stores the type of the branch instruction whose predicted target address 164 is provided by BTAC array 102 to multiplexer 126. In particular, if the branch instruction type is a return instruction, BTAC array 102 generates a true value on a ret signal 138, which is provided to branch control logic 112. Additionally, BTAC array 102 outputs an override signal 136, discussed in detail below, which is also provided to branch control logic 112. In one embodiment, the branch instruction type field stored in each BTAC array 102 entry comprises two bits, which are encoded as shown in Table 1.

TABLE 1

| 00 | not RET or CALL |
|----|-----------------|
| 01 | CALL |
| 10 | normal RET |
| 11 | override RET |

In one embodiment, the most significant bit of the branch type field is provided on ret signal 138 and the least significant bit of the override signal is provided on override signal 136. In the case of a CALL instruction, the override signal 136 is not used. As may be observed, no additional storage is required to accommodate the override bit since the type field was already two bits and only three of the four possible states were being used, The override signal 136 is piped down the microprocessor 100 pipeline via pipeline registers 101, 103, 105, and 107, as shown. In particular, the output of pipeline register 103, denoted override_F signal 172, is provided to branch control logic 112. Additionally, the output of pipeline register 107 is denoted override_E signal 174. Although only four pipeline registers 101, 103, 105, and 107 are shown for piping down override signal 136, other embodiments may include more pipeline stages.

In one embodiment, when branch resolution logic 124 resolves a new call instruction, the target address of the call instruction is cached in BTAC array 102 along with a type field value indicating a CALL instruction. Similarly, when branch resolution logic 124 resolves a new return instruction, the target address of the return instruction is cached in BTAC array 102 along with a type field value indicating a normal RET instruction.

Microprocessor 100 also includes a return stack 104, referred to as BTAC return stack 104, coupled to receive ret signal 138 from BTAC array 102. BTAC return stack 104 caches return addresses specified by call instructions in a last-in-first-out manner. In one embodiment, when branch resolution logic 124 resolves a new call instruction, the return address specified by the call instruction is pushed onto the top of BTAC return stack 104. When BTAC array 102 indicates via ret signal 138 that a return instruction is present in the cache line 186 specified by fetch address 132, the return address at the top of BTAC return stack 104 is popped and provided as a target address 142 to multiplexer 126. Branch control logic 112 controls multiplexer 126 via a control signal 184 to select the target address 142 predicted by BTAC return stack 104 if ret signal 138 is true and override signal 136 is false. Otherwise, branch control logic 112 controls multiplexer 126 via control signal 184 to select the target address 164 predicted by BTAC array 102.

Microprocessor 100 also includes a second return stack 116, referred to as F-stage return stack 116, coupled to receive ret signal 154 from instruction decoder 114. F-stage return stack 116 caches return addresses specified by call instructions in a last-in-first-out manner. In one embodiment, when branch resolution logic 124 resolves a new call instruction, the return address specified by the call instruction is pushed onto the top of F-stage return stack 116. When instruction decoder 114 indicates via ret signal 154 that a return instruction has been decoded, the return address at the top of F-stage return stack 116 is popped and provided as a target address 146 to multiplexer 106.

Microprocessor 100 also includes a comparator 118. Comparator 118 compares F-stage return stack 116 target address 146 and piped-down target address 176. Comparator 118 generates a true value on a mismatch signal 152, which is provided to branch control logic 112, if F-stage return stack 116 target address 146 and piped-down target address 176 do not match. Branch control logic 112 controls multiplexer 106 via control signal 168 to select F-stage return stack 116 target address 146 if ret signal 154 is true, if override_F 172 is false, and if mismatch signal 152 is true. Otherwise, branch control logic 112 controls multiplexer 106 via control signal 168 to select one of its other inputs.

Microprocessor 100 also includes BTAC update logic 122, coupled to branch resolution logic 124 and BTAC array 102. BTAC update logic 122 receives misprediction signal 158 from branch resolution logic 124. BTAC update logic 122 receives override_E signal 174 from pipeline register 107. BTAC update logic 122 generates a BTAC update request signal 134, which is provided to BTAC array 102. BTAC update request signal 134 includes information for updating an entry in BTAC array 102. In one embodiment, BTAC update request signal 134 includes a target address of a branch instruction, the address of the branch instruction, and a value for the type field.

When branch resolution logic 124 resolves a new branch instruction, BTAC update logic 122 generates a BTAC update request 134 to update BTAC array 102 with the information for predicting the target address and type of the new branch instruction on a subsequent occurrence, or instance, of the branch instruction in an instruction cache line specified by fetch address 132. Additionally, if misprediction signal 158 is true, BTAC update logic 122 generates a BTAC update request 134 to update the entry in BTAC array 102 associated with the branch instruction. In particular, if the branch instruction is a return instruction that was mispredicted by BTAC return stack 104 or by F-stage return stack 116, BTAC update logic 122 assigns the override bit in the BTAC array 102 entry to a predetermined value to indicate that the BTAC return stack 104 prediction 142 and F-stage return stack 116 prediction 146 should be overridden by the BTAC array 102 prediction 164 on the next occurrence or instance of the return instruction. In one embodiment, the type field is set to an override RET value, or 11 as specified in Table 1 above. Conversely, if the branch instruction is a return instruction that was mispredicted by BTAC array 102 because the override bit was set, BTAC update logic 122 assigns the override bit in the BTAC array 102 entry to a predetermined value to indicate that the BTAC return stack 104 prediction 142 and, if necessary, the F-stage return stack 116 prediction 146 should be selected rather than the BTAC array 102 prediction 164 on the next occurrence or instance of the return instruction. In one embodiment, the type field is set to a normal RET value, or 10 as specified in Table 1 above. The operation of microprocessor 100 will now be described more fully with respect to FIGS. 2 through 4.

Figure 2:
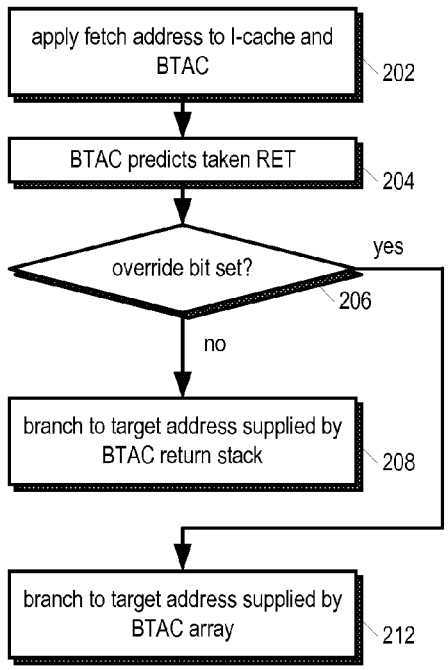
FIG. 2 is a flowchart illustrating operation of the microprocessor of FIG. 1 according to the present invention.

Referring now to FIG. 2, a flowchart illustrating operation of microprocessor 100 of FIG. 1 according to the present invention is shown. FIG. 2 describes the operation of microprocessor 100 in response to a prediction of a return instruction by the BTAC array 102 and the BTAC return stack 104 of FIG. 1. Flow begins at block 202.

At block 202, fetch address 132 of FIG. 1 is applied to instruction cache 108 of FIG. 1 and BTAC array 102 in parallel. In response, instruction cache 108 provides the cache line of instruction bytes 186 of FIG. 1 to the microprocessor 100 pipeline in response to fetch address 132. Flow proceeds to block 204.

At block 204, BTAC array 102 predicts, based on fetch address 132, via ret signal 138 that a return instruction is present in the instruction cache line 186 provided by instruction cache 108 to the microprocessor 100 pipeline, and BTAC array 102 provides target address 164 to multiplexer 126. Flow proceeds to decision block 206.

At decision block 206, branch control logic 112 determines whether override indicator 136 is set. If so, flow proceeds to block 212; otherwise, flow proceeds to block 208.

At block 208, branch control logic 112 controls multiplexer 126 and multiplexer 106 to select the BTAC return stack target address 142 as fetch address 132 to branch microprocessor 100 thereto. Flow ends at block 208.

At block 212, branch control logic 112 controls multiplexer 126 and multiplexer 106 to select the BTAC array target address 164 as fetch address 132 to branch microprocessor 100 thereto. Flow ends at block 212.

As may be observed from FIG. 2, if the override indicator 136 is set, such as during a previous occurrence of the return instruction as described below with respect to block 408, branch control logic 112 advantageously overrides the BTAC return stack 104 and alternatively selects the target address 164 predicted by the BTAC array 102, thereby avoiding an almost certain misprediction by the BTAC return stack 104 if the running program is executing a non-standard call/return sequence.

Figure 3:
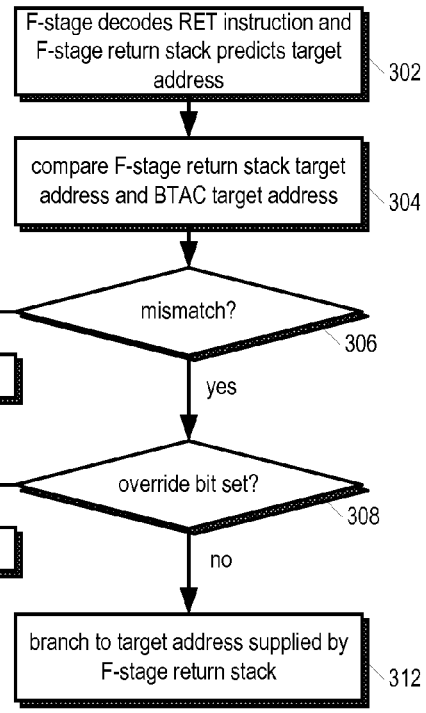
FIG. 3 is a flowchart illustrating operation of the microprocessor of FIG. 1 according to the present invention.

Referring now to FIG. 3, a flowchart illustrating operation of microprocessor 100 of FIG. 1 according to the present invention is shown. FIG. 3 describes the operation of microprocessor 100 in response to a prediction of a return instruction, such as the return instruction predicted in FIG. 2, by F-stage return stack 116 of FIG. 1. Flow begins at block 302.

At block 302, F-stage instruction decoder 114 of FIG. 1 decodes the return instruction that was present in the instruction cache line 186 output by instruction cache 108 in response to fetch address 132 that was applied to BTAC array 102 in block 202 of FIG. 2, and subsequently predicted by BTAC array 102 and BTAC return stack 104 as described with respect to FIG. 2. In response to F-stage instruction decoder 114 indicating via ret signal 154 that a return instruction was decoded, F-stage return stack 116 provides its predicted target address 146 to multiplexer 106. Flow proceeds to block 304.

At block 304, comparator 118 of FIG. 1 compares F-stage return stack predicted target address 146 and target address 176 of FIG. 1. Comparator 118 generates a true value on mismatch signal 152 of FIG. 1 if addresses 146 and 176 do not match. Flow proceeds to decision block 306.

At decision block 306, branch control logic 112 examines mismatch signal 152 to determine whether a mismatch occurred. If so, flow proceeds to decision block 308; otherwise, flow ends.

At decision block 308, branch control logic 112 examines override_F signal 172 of FIG. 1 to determine whether override_F bit 172 is set. If so, flow ends, i.e., the branch to the BTAC array target address 164 performed at block 212 of FIG. 2 is not superceded by the F-stage return stack predicted target address 146. If override_F bit 172 is clear, flow proceeds to block 312.

At block 312, branch control logic 112 controls multiplexer 106 to select the F-stage return stack predicted target address 146 to branch microprocessor 100 thereto. In one embodiment, before branching to the F-stage return stack predicted target address 146, microprocessor 100 flushes the instructions in the stages above the F-stage. Flow ends at block 312.

As may be observed from FIG. 3, if override_F indicator 172 is set, such as during a previous occurrence of the return instruction as described below with respect to block 408, branch control logic 112 advantageously overrides the F-stage return stack 116 and alternatively sustains the target address 164 predicted by the BTAC array 102, thereby avoiding an almost certain misprediction by the F-stage return stack 116 if the running program is executing a non-standard call/return sequence.

Figure 4:
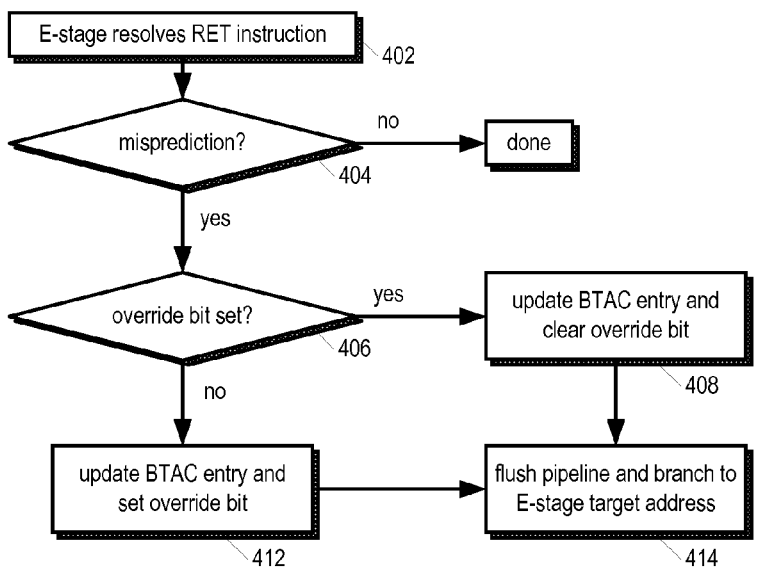
FIG. 4 is a flowchart illustrating operation of the microprocessor of FIG. 1 according to the present invention.

Referring now to FIG. 4, a flowchart illustrating operation of microprocessor 100 of FIG. 1 according to the present invention is shown. FIG. 4 describes the operation of microprocessor 100 in response to resolution of a return instruction, such as a previous instance of the return instruction predicted and decoded in FIGS. 2 and 3. Flow begins at block 402.

At block 402, E-stage branch resolution logic 124 of FIG. 1 resolves a return instruction. That is, branch resolution logic 124 finally determines the correct target address 148 of FIG. 1 of the return instruction. In particular, branch resolution logic 124 generates a true value on misprediction signal 158 of FIG. 1 if microprocessor 100 was caused to branch to an incorrect target address of the return instruction. Flow proceeds to decision block 404.

At decision block 404, BTAC update logic 122 examines misprediction signal 158 to determine whether the return instruction target address was mispredicted. If so, flow proceeds to decision block 406; otherwise flow ends.

At decision block 406, BTAC update logic 122 examines override_E signal 174 to determine whether the override_E bit 174 is set. If so, flow proceeds to block 408; otherwise, flow proceeds to block 412.

At block 408, BTAC update logic 122 generates a BTAC update request 134 to clear the override bit for the entry that mispredicted the return instruction. The present inventors have observed that a given return instruction may be reached from multiple program paths. That is, sometimes a return may be reached from a non-standard code path, such as one of the code paths described above, which always cause a return stack to mispredict the target address of the return instruction; however, the same return instruction may also be reached from a code path that constitutes a standard call/return pair sequence. In the latter case, return stacks generally more accurately predict the target address of a return instruction. Consequently, if a misprediction occurs when the override bit is set, BTAC update logic 122 clears the override bit in block 408 because it is anticipated that the standard call/return pair sequence is predominating. Flow proceeds to block 414.

At block 412, BTAC update logic 122 generates a BTAC update request 134 to set the override bit in the appropriate entry in BTAC array 102 since F-stage return stack 116 mispredicted the return instruction target address. By setting the BTAC 102 override bit for the entry storing the prediction for the return instruction, the present invention advantageously solves the problem created by a non-standard call/return sequence. That is, the BTAC array target address 164 is branched to rather than branching to the BTAC return stack target address 142 or the F-stage return stack predicted target address 146, which would incorrectly predict the return instruction target address. Flow proceeds to block 414.

At block 414, microprocessor 100 flushes its pipeline, since the misprediction of the return instruction target address caused the incorrect instructions to be fetched into the microprocessor 100 pipeline from instruction cache 108; hence, those instructions must not be executed. Subsequently, branch control logic 112 controls multiplexer 106 to select the E-stage target address 146 to branch microprocessor 100 thereto in order to fetch the correct target instructions. Flow ends at block 414.

In one embodiment, block 412 updates the type field of the BTAC array 102 entry with a binary value of 11 and block 408 updates the type field of the BTAC array 102 entry with a binary value of 10, according to Table 1 above.

As may be observed from FIGS. 2 through 4, the override indicator potentially improves the prediction accuracy for a return instruction. If the microprocessor senses that a return instruction may have been executed as part of a non-standard call/return sequence by the fact that the return stack mispredicted the target address of the return instruction, then the microprocessor sets the override indicator associated with the return instruction in the BTAC, and on the next instance of the return instruction, the microprocessor uses a prediction mechanism other than the return stack to predict the return instruction target address, since the microprocessor determines from the override indicator that the return stack is likely to mispredict the target address for the present occurrence of the return instruction. Conversely, although a return instruction may have been previously executed as part of a non-standard call/return sequence, if the microprocessor senses that the return instruction may subsequently have been executed as part of a standard call/return sequence by the fact that the BTAC array mispredicted the return instruction target address, then the microprocessor clears the override indicator associated with the return instruction in the BTAC, and on the next instance of the return instruction, the microprocessor uses the return stack to predict the return instruction target address, since the microprocessor determines from the override indicator that the return stack is likely to correctly predict the target address for the present occurrence of the return instruction.

Figure 5:
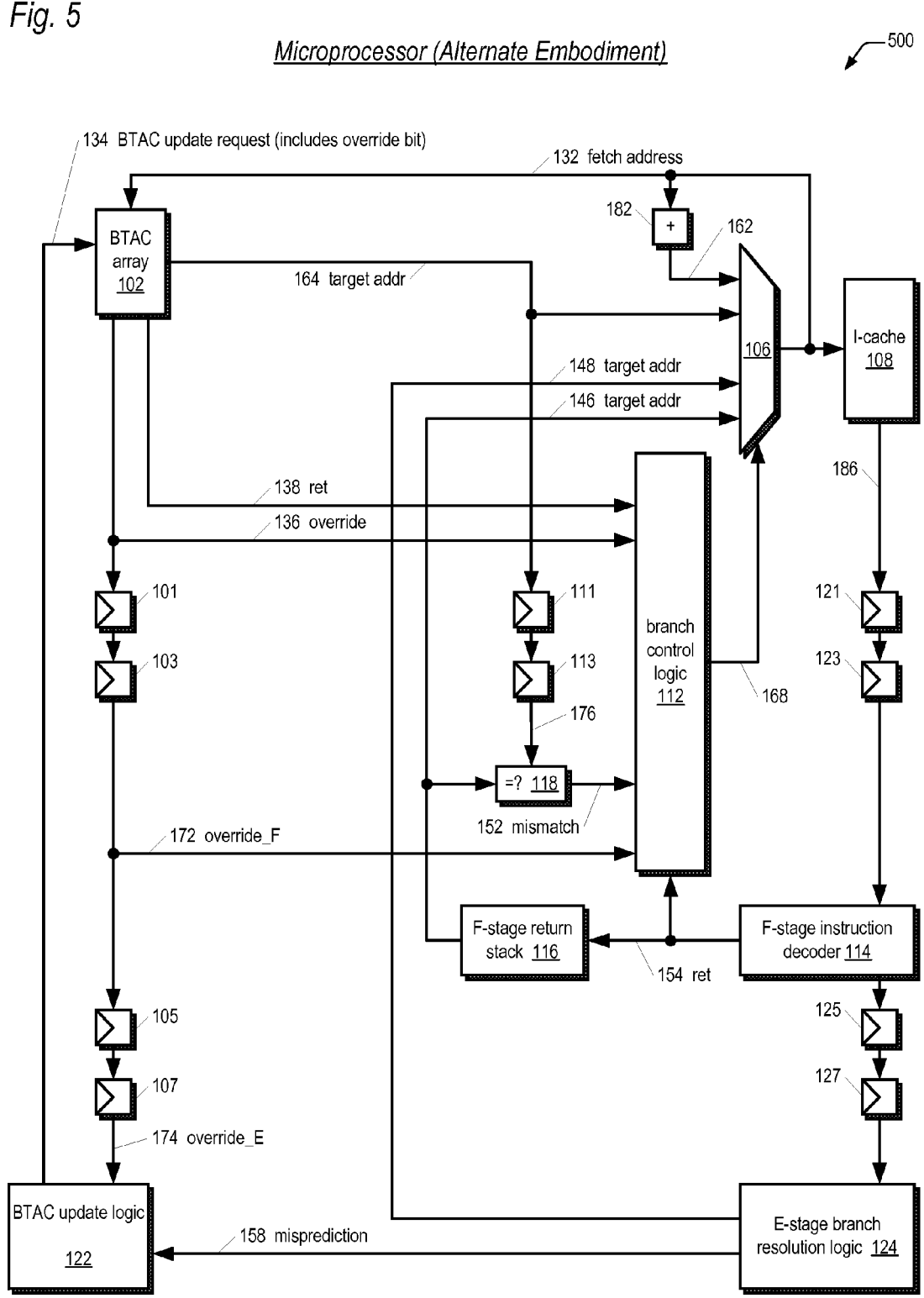
FIG. 5 is a block diagram of a pipelined microprocessor according to an alternate embodiment of the present invention.

Referring now to FIG. 5, a block diagram of a pipelined microprocessor 500 according to an alternate embodiment of the present invention is shown. Microprocessor 500 of FIG. 5 is similar to microprocessor 100 of FIG. 1, except that it does not include BTAC return stack 104 or multiplexer 126. Consequently, the predicted target address 164 output by BTAC array 102 is provided directly to multiplexer 106, rather than through multiplexer 126. Additionally, BTAC array 102 target address 164, rather than target address 144 of FIG. 1, is provided as the input to pipeline register 111 and piped down as target address 176.

Referring now to FIG. 6, a flowchart illustrating operation of microprocessor 500 of FIG. 5 according to an alternate embodiment of the present invention is shown. FIG. 6 is similar to FIG. 2, except that decision block 206 and block 208 are not present; hence, flow proceeds from block 204 to block 212. Therefore, when BTAC array 102 predicts a return instruction via ret signal 138, branch control logic 112 always operates to cause microprocessor 500 to branch to the target address 164 predicted by BTAC array 102, since BTAC return stack 104 and multiplexer 126 of microprocessor 100 of FIG. 1 are not present in microprocessor 500 of FIG. 5.

Microprocessor 500 of FIG. 5 also operates according to the flowcharts of FIGS. 3 and 4. It is noted that since BTAC return stack 104 is not present in microprocessor 500, piped-down target address 176 is always the BTAC array 102 target address 164; hence, the comparison performed in block 304 between F-stage return stack 116 target address 146 and target address 176 is always a comparison with piped-down BTAC array 102 target address 164.

Although the present invention and its objects, features and advantages have been described in detail, other embodiments are encompassed by the invention. For example, although embodiments have been described wherein the microprocessor has two return stacks, the microprocessor may have other numbers of returns stacks, such as only a single return stack, or more than two return stacks. Furthermore, although embodiments are described in which the BTAC is the alternate target address prediction mechanism for overriding the return stack in addition to storing the override bit associated with the return instruction mispredicted by the return stack, other alternate target address prediction mechanisms may be employed, such as a branch target buffer.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A hardware microprocessor, comprising:
wherein the microprocessor is configured to more accurately predict a target address of a return instruction in the presence of a software program that intentionally and explicitly uses the return instruction in a non-standard call/return sequence;
a branch target address cache (BTAC), configured to store a plurality of target address predictions and a corresponding plurality of override indicators for a corresponding plurality of return instructions, and configured to provide a prediction of a target address of the return instruction from among said plurality of target address predictions and to provide a corresponding override indicator from among said plurality of override indicators;
wherein each of said plurality of override indicators is updated to a true value in response to detecting that the microprocessor was caused to branch to an incorrect target address of said corresponding return instruction that was predicted by a return stack for a most recent execution of said return instruction regardless of whether the prediction of the target address of the return instruction provided by the BTAC also was incorrect;
said return stack, configured to provide a prediction of said target address of said return instruction; and
branch control logic, coupled to said return stack and said BTAC, configured to cause the microprocessor to branch to said prediction of said target address of said return instruction provided by said BTAC, and not to said prediction of said target address of said return instruction provided by said return stack, when said override indicator is a true value.

2. The microprocessor of claim 1, wherein each of said plurality of override indicators is updated to a false value in response to detecting that the microprocessor was caused to branch to an incorrect target address of said corresponding return instruction that was predicted by said BTAC for a most recent execution of said return instruction.

3. The microprocessor of claim 1, further comprising:
an instruction cache, coupled to said branch control logic;
wherein said return stack and said BTAC are each configured to provide said prediction contemporaneously with a fetch of said return instruction from said instruction cache.

4. The microprocessor of claim 1, wherein said branch control logic is further configured to cause the microprocessor to branch to said prediction of said target address provided by said return stack, and not to said prediction of said target address provided by said BTAC, when said override indicator is a false value.

5. The microprocessor of claim 1, further comprising:
an instruction cache, coupled to said branch control logic; and
an instruction decoder, coupled to said branch control logic;
wherein said BTAC is configured to provide said prediction contemporaneously with a fetch of said return instruction from said instruction cache;
wherein said return stack is configured to provide said prediction after said instruction decoder decodes said return instruction.

6. The microprocessor of claim 5, further comprising:
a comparator, coupled to said branch control logic, configured to compare said predictions of said target address provided by said return stack and said BTAC;
wherein said branch control logic is configured to cause the microprocessor to branch to said prediction provided by said return stack after having already caused the microprocessor to branch to said prediction provided by said BTAC when said comparator indicates said predictions mismatch and said override indicator is false.

7. The microprocessor of claim 6, wherein said branch control logic is further configured to cause the microprocessor to refrain from branching to said prediction provided by said return stack after having already caused the microprocessor to branch to said prediction provided by said BTAC when said comparator indicates said predictions mismatch and said override indicator is true.

8. The microprocessor of claim 1, wherein the return stack incorrectly predicts the target address of said corresponding return instruction during execution by the microprocessor of a program that performs a non-standard call/return sequence.

9. The microprocessor of claim 1, wherein said true value of said override indicator causes said branch control logic to cause the microprocessor to branch to said prediction of said target address of said return instruction provided by said BTAC, and not to said prediction of said target address of said return instruction provided by said return stack, for an immediately next instance of said return instruction after said most recent execution of said return address.

10. The microprocessor of claim 1, wherein according to the intentional and explicit software program non-standard call/return sequence the target address of the return instruction is not a return address pushed onto a stack in memory by a previous call instruction.

11. The microprocessor of claim 1, wherein according to the intentional and explicit software program non-standard call/return sequence the target address of the return instruction is an address pushed onto a stack in memory by a previous non-call instruction.

12. A method for more accurately predicting a target address of a return instruction in a microprocessor in the presence of a software program that intentionally and explicitly uses the return instruction in a non-standard call/return sequence, the method comprising:
storing in a branch target address cache (BTAC) a plurality of target address predictions and a corresponding plurality of override indicators for a corresponding plurality of return instructions, wherein each of the plurality of override indicators is updated to a true value in response to detecting that the microprocessor was caused to branch to an incorrect target address of the corresponding return instruction that was predicted by a return stack for a most recent execution of the return instruction regardless of whether the prediction of the target address of the return instruction provided by the BTAC also was incorrect;
providing from the BTAC a prediction of the target address of the return instruction from among the plurality of target address predictions and providing a corresponding override indicator from among the plurality of override indicators;
providing from the return stack a prediction of the target address of the return instruction;
determining whether the override indicator provided by the BTAC has a true value; and
causing the microprocessor to branch to the prediction of the target address of the return instruction provided by the BTAC, and not to the prediction of the target address of the return instruction provided by the return stack, if the override indicator is a true value.

13. The method of claim 12, wherein each of the plurality of override indicators is updated to a false value in response to detecting that the microprocessor was caused to branch to an incorrect target address of the corresponding return instruction for a most recent execution of the return instruction.

14. The method of claim 12, further comprising:
fetching the return instruction from an instruction cache of the microprocessor;
wherein the return stack and the BTAC perform said providing contemporaneously with said fetching.

15. The method of claim 12, further comprising:
causing the microprocessor to branch to the prediction of the target address provided by the return stack, and not to the prediction of the target address provided by the BTAC, if the override indicator is a false value.

16. The method of claim 12, further comprising:
fetching the return instruction from an instruction cache of the microprocessor; and
decoding the return instruction, after said fetching;
wherein the BTAC performs said providing contemporaneously with said fetching;
wherein the return stack performs said providing after said decoding.

17. The method of claim 16, further comprising:
comparing the predictions of the target address provided by the return stack and the BTAC; and
causing the microprocessor to branch to the prediction provided by the return stack after having already said causing the microprocessor to branch to the prediction provided by the BTAC, if said comparing indicates the predictions mismatch and the override indicator is false.

18. The method of claim 17, further comprising:
refraining from said branching to the prediction provided by the return stack after having already said causing the microprocessor to branch to the prediction provided by the BTAC, if said comparing indicates the predictions mismatch and the override indicator is true.

19. The method of claim 12, wherein the return stack incorrectly predicts the target address of said corresponding return instruction during execution by the microprocessor of a program that performs a non-standard call/return sequence.

20. The method of claim 12, wherein said causing the microprocessor to branch to the prediction of the target address of the return instruction provided by the BTAC, and not to the prediction of the target address of the return instruction provided by the return stack, if the override indicator is a true value, is performed for an immediately next instance of said return instruction after said most recent execution of said return address.

21. A computer program product for use with a computing device, the computer program product comprising:
a computer usable storage medium, having computer readable program code embodied in said medium, for causing a microprocessor, wherein the microprocessor is configured to more accurately predict a target address of a return instruction in the presence of a software program that intentionally and explicitly uses the return instruction in a non-standard call/return sequence, said computer readable program code comprising:
first program code for providing a branch target address cache (BTAC), configured to store a plurality of target address predictions and a corresponding plurality of override indicators for a corresponding plurality of return instructions, and configured to provide a prediction of a target address of the return instruction from among said plurality of target address predictions and to provide a corresponding override indicator from among said plurality of override indicators, wherein each of said plurality of override indicators is updated to a true value in response to detecting that the microprocessor was caused to branch to an incorrect target address of said corresponding return instruction that was predicted by a return stack for a most recent execution of said return instruction regardless of whether the prediction of the target address of the return instruction provided by the BTAC also was incorrect;
second program code for providing said return stack, configured to provide a prediction of said target address of said return instruction; and
third program code for providing branch control logic, coupled to said return stack and said BTAC, configured to cause the microprocessor to branch to said prediction of said target address of said return instruction provided by said BTAC, and not to said prediction of said target address of said return instruction provided by said return stack, when said override indicator is a true value.

22. The computer program product of claim 21, wherein each of said plurality of override indicators is updated to a false value in response to detecting that the microprocessor was caused to branch to an incorrect target address of said corresponding return instruction for a most recent execution of said return instruction.

23. The computer program product of claim 21, further comprising:
fourth program code for providing an instruction cache, coupled to said branch control logic;
wherein said return stack and said BTAC are each configured to provide said prediction contemporaneously with a fetch of said return instruction from said instruction cache.

24. The computer program product of claim 21, wherein said branch control logic is further configured to cause the microprocessor to branch to said prediction of said target address provided by said return stack, and not to said prediction of said target address provided by said BTAC, when said override indicator is a false value.

25. The computer program product of claim 21, further comprising:
fourth program code for providing an instruction cache, coupled to said branch control logic; and
fifth program code for providing an instruction decoder, coupled to said branch control logic;
wherein said BTAC is configured to provide said prediction contemporaneously with a fetch of said return instruction from said instruction cache;
wherein said return stack is configured to provide said prediction after said instruction decoder decodes said return instruction.

26. The computer program product of claim 25, further comprising:
sixth program code for providing a comparator, coupled to said branch control logic, configured to compare said predictions of said target address provided by said return stack and said BTAC;
wherein said branch control logic is configured to cause the microprocessor to branch to said prediction provided by said return stack after having already caused the microprocessor to branch to said prediction provided by said BTAC when said comparator indicates said predictions mismatch and said override indicator is false.

27. The computer program product of claim 26, wherein said branch control logic is further configured to cause the microprocessor to refrain from branching to said prediction provided by said return stack after having already caused the microprocessor to branch to said prediction provided by said BTAC when said comparator indicates said predictions mismatch and said override indicator is true.

28. The computer program product of claim 21, wherein the return stack incorrectly predicts the target address of said corresponding return instruction during execution by the microprocessor of a program that performs a non-standard call/return sequence.

29. The computer program product of claim 21, wherein said true value of said override indicator causes said branch control logic to cause the microprocessor to branch to said prediction of said target address of said return instruction provided by said BTAC, and not to said prediction of said target address of said return instruction provided by said return stack, for an immediately next instance of said return instruction after said most recent execution of said return address.

* * * * *